UNITED STATES PATENT OFFICE.

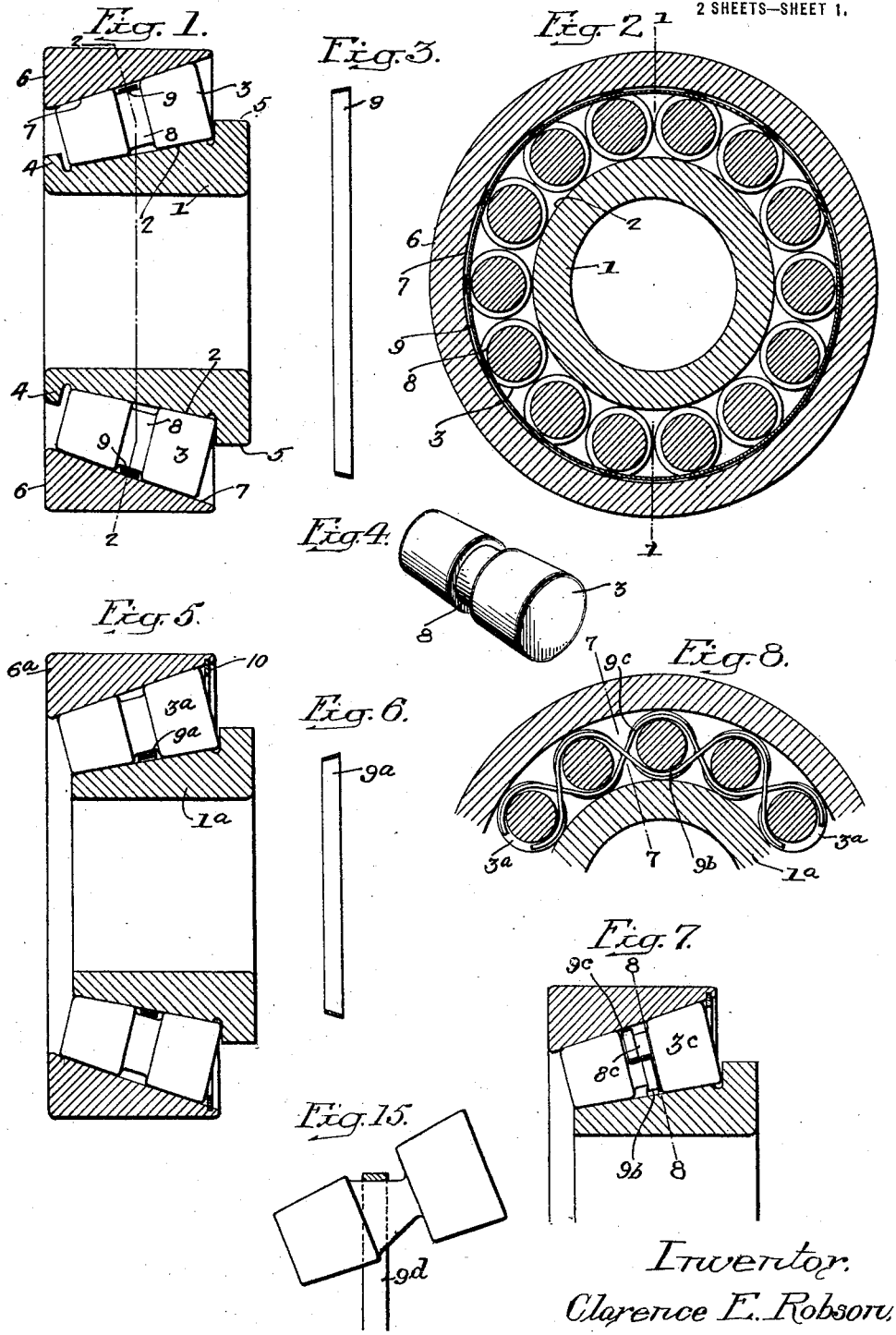

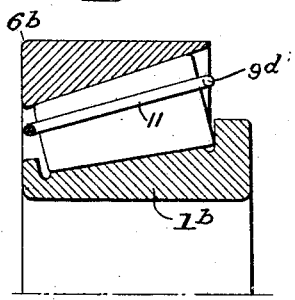
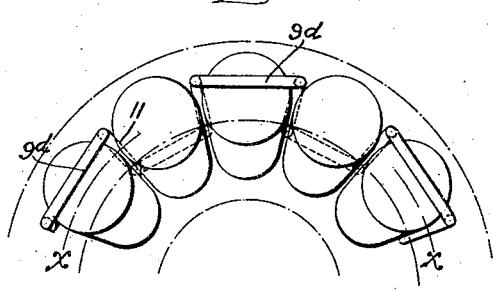
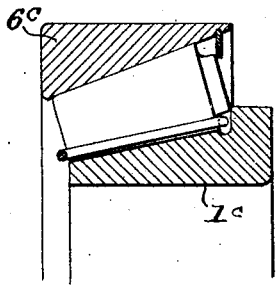
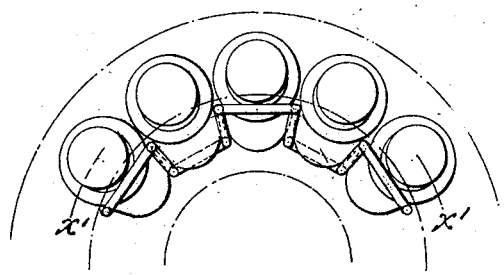
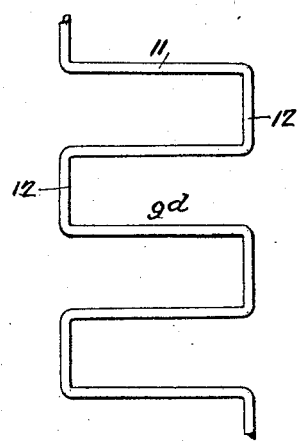
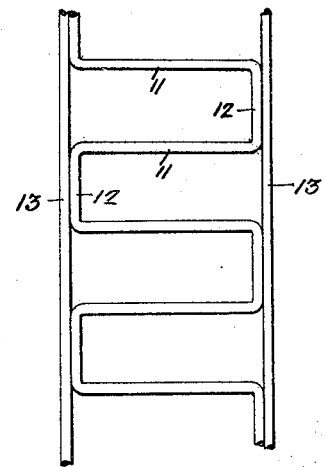

CLARENCE E. ROBSON, OF PHILADELPHIA, PENNSYLVANIA.

ROLLER-BEARING.

1,389,385.  Specification of Letters Patent.  Patented Aug. 30, 1921.

Application filed February 25, 1919. Serial No. 279,059.

*To all whom it may concern:*

Be it known that I, CLARENCE E. ROBSON, a citizen of the United States, residing in Philadelphia, Pennsylvania, have invented certain Improvements in Roller-Bearings, of which the following is a specification.

My invention relates to certain improvements in roller bearings, particularly those of a conical type adapted to conical raceways.

One object of my invention is to provide means for retaining the assembled rollers in position, so that the raceway can be removed without disarranging the rollers.

A further object is to provide means for retaining the several rollers on one of the raceways while the bearing is being assembled, or when one raceway is being removed.

A still further object of the invention is to locate the retaining means so as not to interfere with the freedom of the movement of the rollers while in action.

In the accompanying drawings:—

Figure 1, is a sectional view through a roller bearing on the line 1—1, Fig. 2, illustrating my invention;

Fig. 2, is a sectional view on the line 2—2, Fig. 1;

Fig. 3, is a detached sectional view of the retaining ring;

Fig. 4, is a detached perspective view of one of the rollers;

Fig. 5, is a view illustrating the arrangement of the retaining ring so that it will hold the rollers to the outer raceway;

Fig. 6, is a detached sectional view of the ring illustrated in Fig. 5;

Fig. 7, is a sectional view of a modification on the line 7—7, Fig. 8;

Fig. 8, is a sectional view on the line 8—8, Fig. 7;

Figs. 9 and 10, are views of a modification in which a bent steel wire is used with the ring for retaining the rollers on the inner raceway;

Figs. 11 and 12, are views of a similar wire for retaining the rollers on the outer raceway;

Fig. 13, is a development of the one piece steel wire shown in Figs. 9 and 10;

Fig. 14, is a development of the bent wire ring with solid rings at each side welded thereto; and Fig. 15, is a view illustrating a modification of the roller.

Referring in the first instance to Figs. 1 to 4, inclusive, 1 is an inner raceway adapted to an axle, or other support, and this raceway has a conical bearing surface 2 for the rollers 3. The raceway 1 has flanges 4 and 5 at each end thereof. A narrow groove separates the raceway from the flanges. This construction limits the longitudinal movement of the rollers.

6 is the outer raceway which may be mounted in the hub of a wheel, or other device, when the outer raceway rotates on a fixed bearing, or when the inner raceway rotates the outer raceway may be held in any suitable bearing. The raceway 6 has a conical bearing surface 7.

It will be noted that the rollers 3 are conical so as to coincide with the two conical bearing surfaces 2 and 7. It is very difficult to assemble the loose rollers in the space between the raceways and when it is desired to remove the rollers they are liable to fall out of position the moment the raceways are separated; I overcome this difficulty as follows, a groove 8 is formed in each roller, preferably at the center, and of a width to receive freely a solid ring 9 and is preferably conical, as shown in Fig. 3, to correspond to the surface of the base of the groove 8 of the rollers 3, but the base of the groove in the rollers may be made conical as shown in Fig. 15, and a ring $9^d$, made as shown, may hold the rollers in place.

In assembling the rollers on the inner raceway, the ring is placed in position around the raceway and the rollers, one after another, are placed in position between the ring and the raceway with the rings seated in their grooves so as to maintain them in position on the raceway without interference with their accommodating themselves to the bearing surfaces. When the last roller is placed in position on the raceway a little force is required to push it past the ring so as to allow it to assume the position illustrated in Fig. 1, after which the assembled rollers are free to rotate on the raceway without the ring interfering with their movement. The ring prevents the internal displacement of the rollers so that the outer raceway can be located in position, as illustrated in Fig. 1, or removed, as desired, without the liability of the rollers becoming disarranged.

When it is desired to hold the rollers in position on the outer raceway, I arrange the ring $9^a$ as shown in Figs. 5 and 6, so that the rollers are between the ring and the outer raceway 6ª, and the assembling of the rollers is accomplished in the same manner as in the construction illustrated in Fig. 1, viz., the ring is located within the raceway 6ª and one roller after another is placed in position, while the last roller is forced into position. I preferably use a split retaining ring 10 sprung into a groove in the outer raceway, as shown in Fig. 5, so as to serve as a retaining flange for limiting the longitudinal movement of the rollers 3ª in the raceway 6ª and keeping the assembled rollers in place on the raceway. This removable retaining flange 10, it will be seen, is located at the end of the raceway whence the rollers could otherwise be removed;— i. e., as shown, at the large end of the raceway. It will be seen that the raceway, the rollers, and the retaining rings constitute a unitary assembly which may be separated from the rest of the bearing without falling apart.

In Figs. 7 and 8, I have illustrated another modification in which two solid retaining rings 9ᵇ and 9ᶜ of generally truncated cone forms are used, the rings being bent so that one ring passes under alternate rollers and over the other rollers, while the other ring passes over alternate rollers and under the other rollers, as in Fig. 8. The wavy rings occupy the space formed by the grooves 8ᶜ in the rollers 3ᶜ and are so interlaced with the rollers and engaged in their grooves as to retain them properly assembled for mounting on the raceways. Thus the assembled rollers with the two retaining rings 9ᵇ, 9ᶜ form a unitary assembly which can be separated from the other parts of the bearings without falling apart. The rollers are placed one after another in the space formed by the two rings and the last roller is forced into position and when the several rollers are in position, the two rings retain them in cylindrical form so that they can be moved as a unit from either of the raceways, or can be readily located in position between the raceways.

In Figs. 9 and 10, I have shown another modification in which the rollers are not grooved, and the rollers have a full bearing on the two raceways. In this instance, I use a wire 9ᵈ, which is bent as shown in Fig. 13, so as to form transverse bars 11 connected together by end bars 12 alternately arranged, so that when the rollers are assembled the bars 11 are located between the several rollers and slightly beyond the center $x$ through the rollers. This construction holds the rollers in position on the inner raceway 1ᵇ when the outer raceway 6ᵇ is removed.

In Figs. 11 and 12, I have shown the same construction of retaining ring, only the ring is somewhat smaller and the bars 11 fit between the rollers within the center line $x'$, Fig. 12, so that when the parts are detached the ring holds the rollers in position on the raceway 6ᶜ, while the raceway 1ᶜ can be removed.

In Fig. 13, I have shown the wire bent to form cross bars 11 connected alternately at each end by bars 12, while in Fig. 14 I have shown two rings 13, one at each side, connected to the bars 12 by welding so as to make the construction more rigid.

The main feature of the invention is to provide a ring for holding the rollers onto either one of the raceways when the two raceways are separated.

Another important feature of the invention is the location of the ring in grooves formed in the rollers, the grooves being at any point throughout the length of the roller, so arranged that the grooves of the several rollers will be in alinement.

I claim:—

1. A roller bearing assembly comprising a conical raceway; a series of conical rollers arranged substantially close together on said raceway and annularly grooved between their ends; thin, narrow annular retaining means adapted to seat in the grooves of the rollers and mantain them in position on the raceway without interference with their accommodating themselves to the bearing surfaces; and a split retaining ring for keeping the assembled rollers in place removably seated in a groove in the end of said raceway whence the rollers could otherwise be removed.

2. A roller bearing assembly comprising a series of conical rollers annularly grooved between their ends; and a pair of thin, narrow wavy retaining rings adapted to be engaged in said grooves of said rollers and interlaced with them to retain them properly assembled for mounting on raceways.

In witness whereof I affix my signature.

CLARENCE E. ROBSON.